United States Patent
Li et al.

(10) Patent No.: US 11,536,801 B1
(45) Date of Patent: Dec. 27, 2022

(54) VEHICLE RADAR SENSOR UTILIZING NON-UNIFORM FREQUENCY MODULATED CONTINUOUS WAVE (FMCW) CHIRPS

(71) Applicant: Aurora Operations, Inc., Mountain View, CA (US)

(72) Inventors: Chunshu Li, Mountain View, CA (US); Stephen Crouch, Bozeman, MT (US)

(73) Assignee: Aurora Operations, Inc., Mountain View, CA (US)

( * ) Notice: Subject to any disclaimer, the term of this patent is extended or adjusted under 35 U.S.C. 154(b) by 0 days.

(21) Appl. No.: 17/512,521

(22) Filed: Oct. 27, 2021

(51) Int. Cl.
*G01S 7/35* (2006.01)
*G01S 13/34* (2006.01)
*B60W 60/00* (2020.01)
*G01S 13/931* (2020.01)
*G01S 7/40* (2006.01)

(52) U.S. Cl.
CPC .............. *G01S 7/35* (2013.01); *B60W 60/001* (2020.02); *G01S 7/356* (2021.05); *G01S 7/4056* (2013.01); *G01S 13/347* (2013.01); *G01S 13/931* (2013.01); *B60W 2420/52* (2013.01)

(58) Field of Classification Search
CPC .......... G01S 7/35; G01S 7/356; G01S 7/4056; G01S 13/347; G01S 13/931; B60W 60/001; B60W 2420/52
See application file for complete search history.

(56) References Cited

U.S. PATENT DOCUMENTS

| | | | |
|---|---|---|---|
| 9,645,228 B1 * | 5/2017 | Doerry | G01S 13/0209 |
| 10,436,891 B2 * | 10/2019 | Schoor | G01S 13/343 |
| 2009/0085800 A1 * | 4/2009 | Alland | G01S 13/343 |
| | | | 342/25 R |
| 2016/0139257 A1 * | 5/2016 | Yamashina | G01S 7/354 |
| | | | 342/109 |
| 2017/0131394 A1 * | 5/2017 | Roger | G01S 13/343 |
| 2021/0156982 A1 * | 5/2021 | Stettiner | G01S 7/0232 |
| 2021/0341598 A1 * | 11/2021 | Sahara | G01S 13/931 |
| 2022/0146625 A1 * | 5/2022 | Nishikido | G01S 7/4026 |

* cited by examiner

*Primary Examiner* — Donald Hb Braswell
(74) *Attorney, Agent, or Firm* — Middleton Reutlinger

(57) ABSTRACT

A vehicle radar sensor utilizes Frequency Modulated Continuous Wave (FMCW) radar signals that incorporate non-uniform FMCW chirps having chirp profiles that differ from one another to sense one or more parameters of one or more objects in a field of view of the radar sensor. The chirp profiles may differ from one another in various manners, e.g., based on starting frequency, repetition interval, duration and/or slope, and among other advantages, may be used to enhance sensing of various parameters such as range, Doppler/velocity and/or angle.

19 Claims, 8 Drawing Sheets

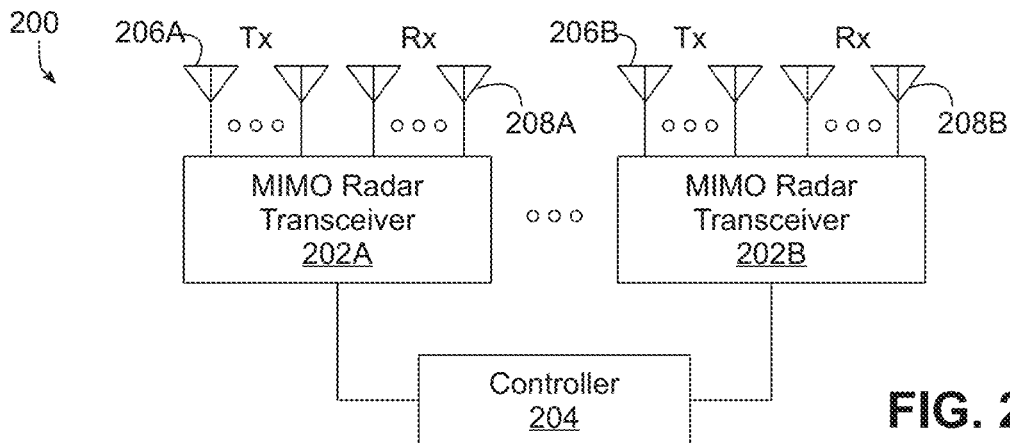
FIG. 2
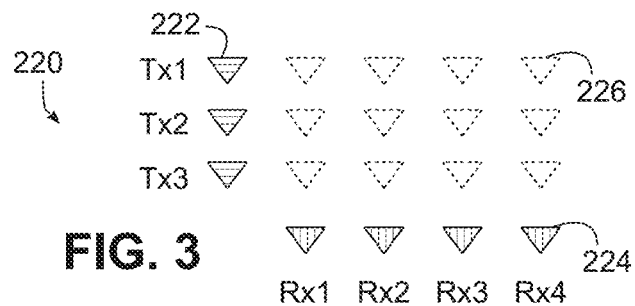
FIG. 3
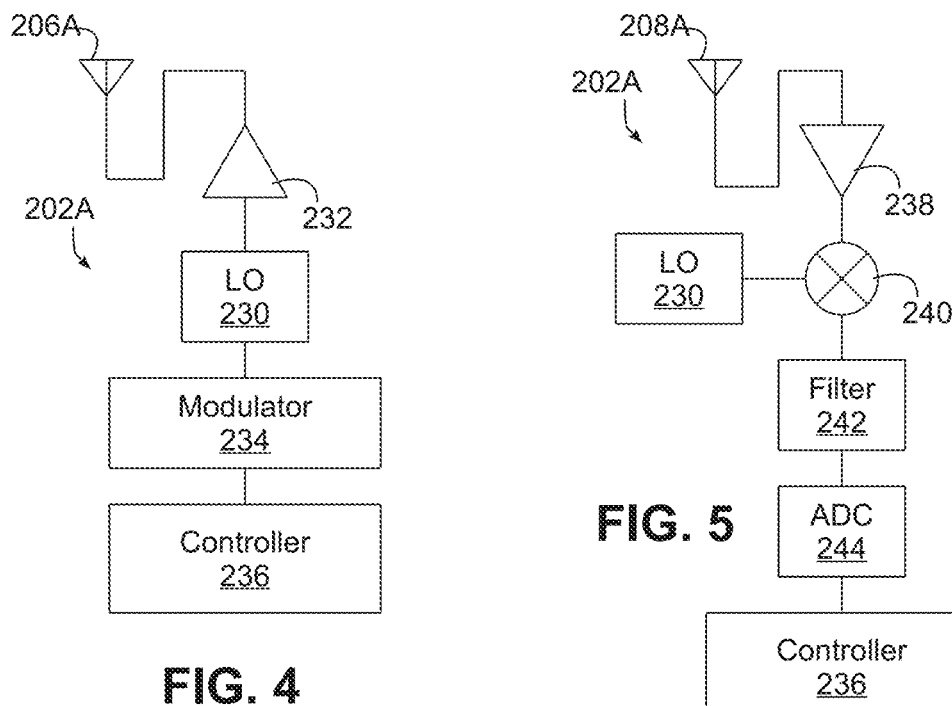
FIG. 4
FIG. 5

VEHICLE RADAR SENSOR UTILIZING NON-UNIFORM FREQUENCY MODULATED CONTINUOUS WAVE (FMCW) CHIRPS

BACKGROUND

As computing and vehicular technologies continue to evolve, autonomy-related features have become more powerful and widely available, and capable of controlling vehicles in a wider variety of circumstances. For automobiles, for example, the automotive industry has generally adopted SAE International standard J3016, which designates 6 levels of autonomy. A vehicle with no autonomy is designated as Level 0, and with Level 1 autonomy, a vehicle controls steering or speed (but not both), leaving the operator to perform most vehicle functions. With Level 2 autonomy, a vehicle is capable of controlling steering, speed and braking in limited circumstances (e.g., while traveling along a highway), but the operator is still required to remain alert and be ready to take over operation at any instant, as well as to handle any maneuvers such as changing lanes or turning. Starting with Level 3 autonomy, a vehicle can manage most operating variables, including monitoring the surrounding environment, but an operator is still required to remain alert and take over whenever a scenario the vehicle is unable to handle is encountered. Level 4 autonomy provides an ability to operate without operator input, but only in specific conditions such as only certain types of roads (e.g., highways) or only certain geographical areas (e.g., specific cities for which adequate mapping data exists). Finally, Level 5 autonomy represents a level of autonomy where a vehicle is capable of operating free of operator control under any circumstances where a human operator could also operate.

The fundamental challenges of any autonomy-related technology relate to collecting and interpreting information about a vehicle's surrounding environment, along with making and implementing decisions to appropriately control the vehicle given the current environment within which the vehicle is operating. Therefore, continuing efforts are being made to improve each of these aspects, and by doing so, autonomous vehicles increasingly are able to reliably handle a wider variety of situations and accommodate both expected and unexpected conditions within an environment.

One particular technology that is increasingly relied upon for collecting information about a vehicle's surrounding environment is radar, which is based on the emission, reflection and sensing of radio wave electromagnetic radiation within an environment to detect, and in some instances, determine the position and/or velocity of, various objects (also sometimes referred to as targets) within the environment. Despite continuing improvements to radar performance, however, both cost and technical limitations continue to exist, so a continuing need exists for improvements to radar technology, and particularly for radar technology used in connection with the control of an autonomous vehicle.

Some radar sensors used in automotive applications, for example, rely on Frequency Modulated Continuous Wave (FMCW) radar signals where a frame of "chirps" is emitted by a radar transmitter and sensed by a radar receiver in order to determine the position and/or velocity of various objects within an environment. The chirps generated by a radar transmitter generally have the same chirp profile, e.g., with the same starting frequency, the same duration, the same repetition interval and the same slope, and the configuration of the chirp profile, with a practically limited analog to digital conversion (ADC) sampling rate, can greatly impact the maximum range, the maximum unambiguous velocity, the responsiveness and the resolution of the radar sensor. Further complicating radar sensor performance are the inherent limitations of analog to digital conversion (ADC), as the sampling rate of an ADC circuit can also impact these various performance parameters. As a result, tradeoffs are often required to be made in order to balance appropriate range, velocity, responsiveness, and resolution capabilities of a radar sensor.

SUMMARY

The present disclosure is generally related to a vehicle radar sensor that utilizes Frequency Modulated Continuous Wave (FMCW) radar signals that incorporate non-uniform FMCW chirps having chirp profiles that differ from one another to sense one or more parameters of one or more objects in a field of view of the radar sensor. The chirp profiles may differ from one another in various manners, e.g., based on starting frequency, repetition interval, duration and/or slope, and among other advantages, may be used to enhance sensing of various parameters such as range, Doppler/velocity and/or angle.

Therefore, consistent with one aspect of the invention, a radar sensor for a vehicle may include a radar transmitter configured to transmit a first radar signal, the first radar signal including a frame associated with a plurality of frequency modulated continuous wave (FMCW) chirps, where at least a subset of the plurality of FMWC chirps are non-uniform FMCW chirps having chirp profiles that differ from one another, a radar receiver configured to receive a second radar signal that is a reflected signal of the first radar signal, and control logic coupled to the radar receiver and configured to process the second radar signal, based on the non-uniform FMCW chirps in the frame, to sense one or more parameters of an object in a field of view of the radar transmitter.

In some embodiments, the chirp profiles of the FMCW chirps differ based upon starting frequency. Also, in some embodiments, the chirp profiles of the FMCW chirps differ based upon repetition interval. Further, in some embodiments, the chirp profiles of the FMCW chirps differ based upon chirp duration. In some embodiments, the chirp profiles of the FMCW chirps differ based upon chirp slope.

In addition, in some embodiments, the frame further includes a plurality of uniform FMCW chirps having a substantially same chirp profile. In some embodiments, the at least a subset of the plurality of FMWC chirps includes a plurality of non-uniform FMCW chirps having chirp profiles that differ from one another, and the plurality of uniform FMCW chirps and the plurality of non-uniform FMCW chirps are interleaved with one another.

In addition, in some embodiments, the control logic is configured to process the second radar signal to sense one or more parameters of a plurality of objects in a field of view of the radar transmitter, the chirp profiles of the FMCW chirps differ based upon starting frequency and repetition interval, and the control logic uses the non-uniform FMCW chirps in the frame to sense the one or more parameters of the plurality of objects by performing a range transformation with fast-time samples of the second radar signal to generate a coarse resolution data cube including coarse resolution range parameters for the plurality of objects and arranged in a plurality of range bins in a fast-time dimension, upsampling the generated coarse resolution data cube along the fast-time dimension to generate an upsampled data cube, compensating for phase variations due to starting frequency variations in the non-uniform FMCW chirps along a slow-time dimension of the upsampled data cube for each of the plurality of range bins to enhance range resolution in the upsampled data cube, and performing a Doppler transformation on the upsampled data cube based upon starting frequency and repetition interval variations in the non-uniform FMCW chirps to generate Doppler parameters for the plurality of objects. Moreover, in some embodiments, the range transformation includes a Fast Fourier Transform (FFT) transformation and the Doppler transformation includes a Discrete Fourier Transform (DFT) transformation.

In some embodiments, the chirp profiles of the FMCW chirps differ based upon starting frequency and repetition interval, the frame further includes a plurality of uniform FMCW chirps having a substantially same chirp profile, and the control logic uses the non-uniform FMCW chirps in the frame to sense the one or more parameters of the object by generating a uniform data cube by performing a range transformation with fast-time samples of the second radar signal and using the uniform FMCW chirps, and detecting a plurality of candidate objects in the uniform data cube. Moreover, in some embodiments, the control logic further uses the non-uniform FMCW chirps in the frame to sense the one or more parameters of the object by generating a non-uniform data cube by performing a range transformation with fast-time samples of the second radar signal and using the non-uniform FMCW chirps, and enhancing range resolution for at least a subset of the plurality of candidate objects using the non-uniform data cube.

In some embodiments, the control logic further uses the non-uniform FMCW chirps in the frame to sense the one or more parameters of the object by generating a non-uniform data cube by performing a range transformation with fast-time samples of the second radar signal and using the non-uniform FMCW chirps, and performing a Doppler transformation with the non-uniform data cube to resolve Doppler ambiguity in at least a subset of the plurality of candidate objects. In addition, in some embodiments, the control logic further uses the non-uniform FMCW chirps in the frame to sense the one or more parameters of the object by performing a Doppler transformation with the uniform data cube to generate Doppler parameters for the plurality of candidate objects, where performing the Doppler transformation with the uniform data cube introduces Doppler ambiguity in the uniform data cube, and performing the Doppler transformation with the non-uniform data cube resolves the Doppler ambiguity introduced in the uniform data cube. In some embodiments, the Doppler transformation performed with the uniform data cube includes a Fast Fourier Transform (FFT) transformation and the Doppler transformation performed with the non-uniform data cube includes a Discrete Fourier Transform (DFT) transformation.

Moreover, in some embodiments, the control logic further uses the non-uniform FMCW chirps in the frame to sense the one or more parameters of the object by generating a non-uniform data cube by performing a range transformation with fast-time samples of the second radar signal and using the non-uniform FMCW chirps, and performing a beamforming transformation with the non-uniform data cube to resolve angle ambiguity in at least a subset of the plurality of candidate objects in the uniform data cube. Also, in some embodiments, the control logic further uses the non-uniform FMCW chirps in the frame to sense the one or more parameters of the object by performing a beamforming transformation with the uniform data cube to generate angle parameters for the plurality of candidate objects, where performing the beamforming transformation with the uniform data cube introduces angle ambiguity in the uniform data cube, and performing the beamforming transformation with the non-uniform data cube resolves the angle ambiguity introduced in the uniform data cube. In some embodiments, the beamforming transformation performed with the uniform data cube includes a Fast Fourier Transform (FFT) transformation and the beamforming transformation performed with the non-uniform data cube includes a Discrete Fourier Transform (DFT) transformation.

In addition, in some embodiments, the radar transmitter is a multiple input multiple output (MIMO) radar transmitter including a plurality of transmit channels and the radar receiver is a MIMO radar receiver including a plurality of receive channels, the first radar signal is generated for a first transmit channel of the plurality of transmit channels and the second radar signal is received by a first receive channel of the plurality of receive channels, the range transformation performed using the uniform FMCW chirps and the range transformation performed using the non-uniform FMCW chirps are performed concurrently, and the control logic is further configured to perform MIMO demodulation prior to generating the uniform and non-uniform data cubes. Also, in some embodiments, the chirp profiles of the FMCW chirps differ based upon starting frequency such that a total frequency band of the frame is split into a plurality of sub-bands defined by the plurality of non-uniform FMCW chirps, and the control logic uses the non-uniform FMCW chirps in the frame to sense the one or more parameters of the object by subsampling on range within the total frequency band of the frame.

Moreover, in some embodiments, the chirp profiles of the FMCW chirps differ based upon starting frequency and repetition interval, and the control logic uses the non-uniform FMCW chirps in the frame to sense the one or more parameters of the object by subsampling on Doppler over a duration of the frame. Further, in some embodiments, the chirp profiles of the FMCW chirps differ based upon starting frequency and repetition interval, the radar transmitter is a multiple input multiple output (MIMO) radar transmitter including a plurality of transmit channels and the radar receiver is a MIMO radar receiver including a plurality of receive channels, the first radar signal is generated for a first transmit channel of the plurality of transmit channels and the second radar signal is received by a first receive channel of the plurality of receive channels, and the control logic uses the non-uniform FMCW chirps in the frame to sense the one or more parameters of the object by subsampling over an aperture of the MIMO radar receiver.

Consistent with another aspect of the invention, a radar sensor for a vehicle may include a radar transmitter configured to transmit a first radar signal, and control logic coupled to the radar transmitter and configured to control the radar transmitter to generate the first radar signal to include a frame that includes a plurality of frequency modulated continuous wave (FMCW) chirps, where at least a subset of the plurality of FMCW chirps are non-uniform FMCW chirps having chirp profiles that differ from one another.

Consistent with another aspect of the invention, a radar sensor for a vehicle may include a radar receiver configured to receive a second radar signal that is a reflected signal of a first radar signal, the first radar signal including a frame associated with a plurality of frequency modulated continuous wave (FMCW) chirps, where at least a subset of the plurality of FMCW chirps are non-uniform FMCW chirps having chirp profiles that differ from one another, and control logic coupled to the radar receiver and configured to process the second radar signal, based on the non-uniform FMCW chirps in the frame, to sense one or more parameters of an object.

Consistent with another aspect of the invention, a program product may include a non-transitory computer readable medium, and program code stored on the non-transitory computer readable medium and configured upon execution by control logic of a radar sensor for a vehicle to cause a radar transmitter of the radar sensor to transmit a first radar signal, the first radar signal including a frame associated with a plurality of frequency modulated continuous wave (FMCW) chirps, where at least a subset of the plurality of FMCW chirps are non-uniform FMCW chirps having chirp profiles that differ from one another, cause a radar receiver of the radar sensor to receive a second radar signal that is a reflected signal of the first radar signal, and process the second radar signal, based on the non-uniform FMCW chirps in the frame, to sense one or more parameters of an object in a field of view of the radar transmitter.

Consistent with another aspect of the invention, a method of operating a radar sensor for a vehicle may include transmitting a first radar signal, the first radar signal including a frame associated with a plurality of frequency modulated continuous wave (FMCW) chirps, where at least a subset of the plurality of FMCW chirps are non-uniform FMCW chirps having chirp profiles that differ from one another, receiving a second radar signal that is a reflected signal of the first radar signal, and processing the second radar signal, based on the non-uniform FMCW chirps in the frame, to sense one or more parameters of an object in a field of view of the radar transmitter.

Consistent with another aspect of the invention, a radar sensor for a vehicle may include a radar transmitter configured to transmit a first radar signal, the radar signal including a frame associated with a plurality of frequency modulated continuous wave (FMCW) chirps, where the plurality of FMCW chirps includes a plurality of uniform FMCW chirps having a first starting frequency and a first repetition interval and a plurality of non-uniform FMCW chirps having at least one of a starting frequency that differs from the first starting frequency and a repetition interval that differs from the first repetition interval, a radar receiver configured to receive a second radar signal that is a reflected signal of the first radar signal, and control logic coupled to the radar receiver and configured to process the second radar signal by performing a first, range transformation with fast-time samples of the second radar signal to generate first, coarse resolution range parameters, generating uniform and non-uniform data cubes respectively associated with the plurality of uniform FMCW chirps and the plurality of non-uniform FMCW chirps using the coarse resolution range parameters, performing a second transformation with the uniform data cube to generate second parameters, where performing the second transformation introduces ambiguities into the uniform data cube, detecting a plurality of candidate objects in the uniform data cube, and performing a third transformation with the non-uniform data cube and for the plurality of candidate objects to resolve at least a subset of the introduced ambiguities.

Also, in some embodiments, the second and third transformations are Doppler transformations, the second parameters are Doppler parameters, and the ambiguities are Doppler ambiguities. Further, in some embodiments, the second and third transformations are beamforming transformations, the second parameters are angle parameters, and the ambiguities are angle ambiguities. In some embodiments, the first and second transformations each include a Fast Fourier Transform (FFT) transformation and the third transformation includes a Discrete Fourier Transform (DFT) transformation.

Some embodiments may also include enhancing range resolution for at least a subset of the plurality of candidate objects using the non-uniform data cube. Also, in some embodiments, the radar transmitter is a multiple input multiple output (MIMO) radar transmitter including a plurality of transmit channels and the radar receiver is a MIMO radar receiver including a plurality of receive channels, WHERE the first radar signal is generated for a first transmit channel of the plurality of transmit channels and the second radar signal is received by a first receive channel of the plurality of receive channels, and the control logic is further configured to perform MIMO demodulation prior to generating the uniform and non-uniform data cubes.

Consistent with another aspect of the invention, a autonomous vehicle control system may include a radar transmitter configured to transmit a first radar signal, the first radar signal including a frame associated with a plurality of frequency modulated continuous wave (FMCW) chirps, where at least a subset of the plurality of FMWC chirps are non-uniform FMCW chirps having chirp profiles that differ from one another, a radar receiver configured to receive a second radar signal that is a reflected signal of the first radar signal, and control logic coupled to the radar receiver and configured to process the second radar signal, based on the non-uniform FMCW chirps in the frame, to sense one or more parameters of an object in a field of view of the radar transmitter.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates an example implementation of a Multiple Input Multiple Output (MIMO) Frequency Modulated Continuous Wave (FMCW) radar sensor that may be utilized by implementations disclosed herein.

FIG. 3 illustrates an example virtual antenna array capable of being produced by a MIMO FMCW radar sensor that may be utilized by implementations disclosed herein.

FIG. 4 illustrates an example transmitter channel for the MIMO FMCW radar sensor of FIG. 2.

FIG. 5 illustrates an example receiver channel for the MIMO FMCW radar sensor of FIG. 2.

DETAILED DESCRIPTION

The herein-described implementations are generally directed to various improvements associated with Frequency Modulated Continuous Wave (FMCW) radar sensors, e.g., for use in connection with the control of an autonomous or other type of vehicle, among other applications. Further, as will become more apparent below, the herein-described techniques may also be utilized in some implementations within Multiple Input Multiple Output (MIMO) FMCW radar sensors. Prior to discussing such improvements, however, a brief discussion of an autonomous vehicle environment and of MIMO and/or FMCW radar sensors are provided below.

Autonomous Vehicle Environment

Figure 1:
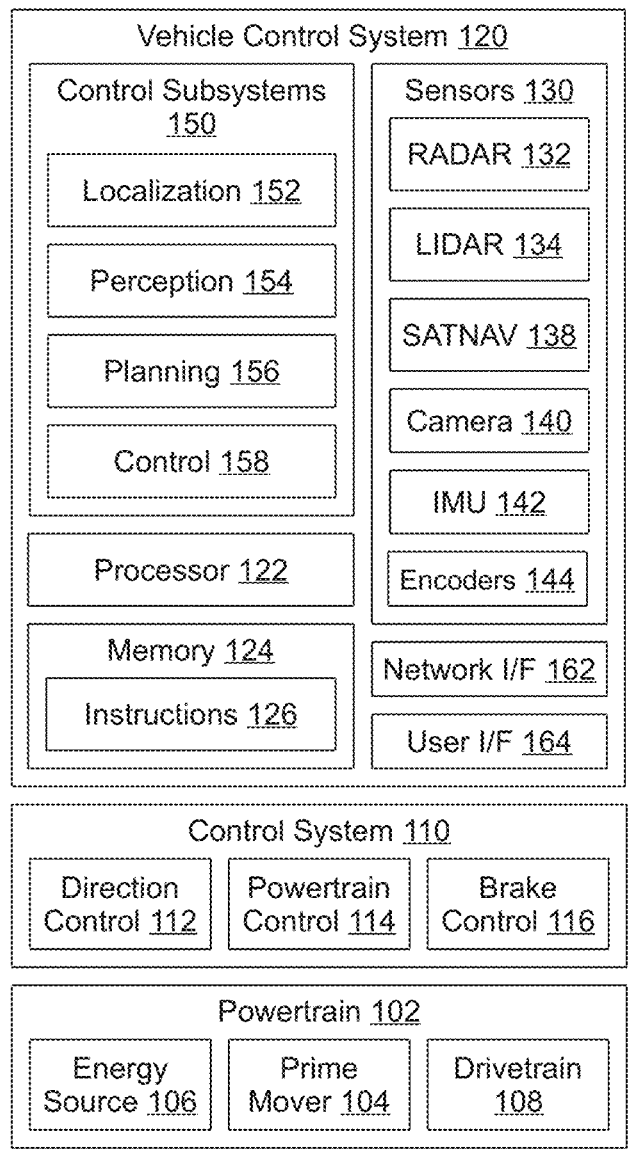
FIG. 1 illustrates an example environment in which implementations disclosed herein can be implemented.

Turning to the Drawings, wherein like numbers denote like parts throughout the several views, FIG. 1 illustrates an autonomous vehicle 100 suitable for utilizing the various techniques described herein. Vehicle 100, for example, may include a powertrain 102 including a prime mover 104 powered by an energy source 106 and capable of providing power to a drivetrain 108, as well as a control system 110 including a direction control 112, a powertrain control 114, and brake control 116. Vehicle 100 may be implemented as any number of different types of vehicles, including vehicles capable of transporting one or both of people and cargo, and it will be appreciated that the aforementioned components 102-116 may vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors, an internal combustion engine, or a combination thereof (among others). The energy source 106 may include, for example, one or more of a fuel system (e.g., providing gasoline, diesel, hydrogen, etc.), a battery system, solar panels or other renewable energy source, and a fuel cell system. Drivetrain 108 may include one or more of wheels, tires, a transmission and any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators, one or more sensors, or a combination thereof for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling one or more of a speed and direction of the vehicle 100. Brake control 116 may be configured to control one or more brakes that slow or stop vehicle 100, e.g., disk or drum brakes coupled to the wheels of the vehicle.

Other vehicle types will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, implementations disclosed herein not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processor(s) 122 may include, for example, one or more graphics processing units (GPUs), one or more central processing units (CPUs), or a combination thereof.

Sensors 130 may include various sensors suitable for collecting information from a vehicle's surrounding environment for use in controlling the operation of the vehicle. For example, sensors 130 may include one or more Radio Detection and Ranging (RADAR) sensors, with which a number of the techniques described herein may be implemented.

Sensors 130 may also optionally include one or more Light Detection and Ranging (LIDAR) sensors 132, as well as one or more satellite navigation (SATNAV) sensors 138, e.g., compatible with any of various satellite navigation systems such as GPS, GLONASS, Galileo, Compass, etc. Each SATNAV sensor 138 may be used to determine the location of the vehicle on the Earth using satellite signals. Sensors 130 may also optionally include one or more cameras 140, one or more inertial measurement units (IMUS) 142, one or more wheel encoders 144, or a combination thereof. Each camera 140 may be a monographic or stereographic camera and may record one or more of still and video imagers. Each IMU 142 may include multiple gyroscopes and accelerometers capable of detecting linear and rotational motion of the vehicle 100 in three directions. Wheel encoders 144 may be used to monitor the rotation of one or more wheels of vehicle 100.

The outputs of sensors 130 may be provided to a set of control subsystems 150, including, for example, a localization subsystem 152, a perception subsystem 154, a planning subsystem 156, and a control subsystem 158. As will become more apparent hereinafter, radar sensors 132 may be used by one or more of such subsystems 152-158 to control an autonomous vehicle.

Localization subsystem 152 may be principally responsible for precisely determining the location and orientation (also sometimes referred to as "pose") of vehicle 100 within its surrounding environment, and generally within some frame of reference.

Perception subsystem 154 may be principally responsible for detecting, tracking and identifying elements within the environment surrounding vehicle 100. For example, perception subsystem 154 may, at each of a plurality of iterations, determine a pose, classification, and velocity for each of one or more objects in the environment surrounding vehicle 100. Further, for example, the perception subsystem 154 may track various objects over multiple iterations. For instance, the perception subsystem 154 may track an additional vehicle over multiple iterations as the additional vehicle moves relative to vehicle 100.

Planning subsystem 156 may be principally responsible for planning a trajectory for vehicle 100 over some timeframe given a desired destination as well as the static and moving objects within the environment. For example, and as described herein, planning subsystem 156 may plan a trajectory for vehicle 100 based at least in part on one or more of a pose, classification, and velocity for each of one or more objects in an environment of the vehicle 100 in the environment surrounding vehicle 100. In some implementations, planning subsystem 156 may plan the trajectory for the vehicle 100 by generating, and considering, candidate trajectories for each of one or more additional mobile objects in the environment. Planning subsystem 156 may determine a candidate trajectory for an object at an iteration based on a pose, classification, velocity, or a combination thereof for the iteration, and may track the object over multiple iterations.

Control subsystem 158 may be principally responsible for generating suitable control signals for controlling the various controls in control system 110 in order to implement the planned trajectory of the vehicle 100.

It will be appreciated that the collection of components illustrated in FIG. 1 for vehicle control system 120 is merely exemplary in nature. Individual sensors may be omitted in some implementations. Additionally or alternatively, in some implementations multiple sensors of the types illustrated in FIG. 1 may be used for redundancy or to cover different regions around a vehicle, and other types of sensors may be used. Likewise, different types and combinations of control subsystems may be used in other implementations. Further, while subsystems 152-158 are illustrated as being separate from processors 122 and memory 124, it will be appreciated that in some implementations, some or all of the functionality of a subsystem 152-158 may be implemented with program code instructions 126 resident in one or more memories 124 and executed by one or more processors 122, and that these subsystems 152-158 may in some instances be implemented using the same processors and memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize circuitry, processors, sensors or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, while in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In addition, while powertrain 102, control system 110, and vehicle control system 120 are illustrated in FIG. 1 as being separate systems, in other implementations, some of all of these systems may be combined into a single system, e.g., with control system 110 and vehicle control system 120 combined into a single autonomous vehicle control system, or using other combinations. Further, in other implementations, some or all of the functionality illustrated as being within one system in FIG. 1 may be implemented in another system.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc. Processors may also be implemented in whole or in part within individual sensors in some implementations.

In addition, for additional storage, vehicle 100 may also include one or more mass storage devices, e.g., one or more of a removable disk drive, a hard disk drive, a direct access storage device (DASD), an optical drive (e.g., a CD drive, a DVD drive, etc.), a solid state storage drive (SSD), network attached storage, a storage area network, and a tape drive, among others. Furthermore, vehicle 100 may include a user interface 164 to enable vehicle 100 to receive a number of inputs from and generate outputs for a user or operator, e.g., one or more displays, touchscreens, voice interfaces, gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks (e.g., one or more of a LAN, a WAN, a wireless network, and the Internet, among others) to permit the communication of information with other computers and electronic devices, including, for example, a central service, such as a cloud service, from which vehicle 100 receives environmental and other data for use in autonomous control thereof.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations may be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

MIMO FMCW Radar Sensors

FIG. 2 next illustrates an example radar sensor 200 within which the various techniques described herein may be implemented. In some implementations, radar sensor 200 may be a distributed radar sensor. In some implementations, sensor 200 includes one or more MIMO radar transceivers (e.g., transceivers 202A and 202B) coupled to a controller 204, with each MIMO radar transceiver generally including multiple transmit (Tx) antennas (e.g., transmit antennas 206A, 206B) and multiple receive (Rx) antennas (e.g., receive antennas 208A, 208B) to implement a phased antenna array.

Each transceiver 202A, 202B may be disposed on a separate integrated circuit (IC) or chip in some implementations, while in other implementations multiple transceivers may be disposed on the same chip. Further, multiple transceivers 202A, 202B may be disposed on separate or common modules, boards, cards, or housings in various implementations. In addition, it will be appreciated that, rather than utilizing transceivers that handle both transmission and reception of radar signals, some implementations may utilize separate circuitry for these functions.

Controller 204 is generally coupled to one or more transceivers. For example, controller 204 is coupled to each transceiver 202A, 202B for controlling both (i) the generation of radar signals for transmission or emission by transmit antennas 206A, 206B and (ii) the reception and processing of radar signals received by receive antennas 208A, 208B. It will be appreciated that the functionality implemented by controller 204 may be allocated in various manners in different implementations, e.g., using one or more chips that are separate from each transceiver 202A, 202B and disposed on the same or different module, board, card or housing, or being wholly or partially integrated into the same chips as one or more of the transceivers. The functionality of controller 204 may also be at least partially implemented external of any radar sensor in some implementations, e.g., integrated into other processors or controllers in the vehicle control system of an autonomous vehicle. Further, while a single controller 204 is illustrated in FIG. 2, the invention is not so limited, as multiple controllers may be used to implement different functionality in a radar sensor in some implementations, e.g., using multiple controllers integrated with each transceiver 202A, 202B. In some implementations, one or more of controller 204 and transceivers 202A, 202B may be implemented using one or more Monolithic Microwave Integrated Circuits (MMICs).

As such, it will be appreciated that the functionality described herein may in some implementations be implemented using various types of control logic, whether integrated into a transmitter, receiver or transceiver, processor, controller, computer system, etc., whether disposed on one or more integrated circuit chips, and whether incorporating hardwired logic or programmable logic capable of executing program code instructions. Control logic may also be considered to include analog circuitry, digital circuitry, or both in various implementations. As such, the invention is not limited to the particular control logic implementation details described herein.

Likewise, transmit antennas 206A, 206B and receive antennas 208A, 208B may be implemented in a wide variety of manners, e.g., as patch antennas disposed on one or more printed circuit boards or cards, or in some instances disposed on or in a package or chip and thus integrated with a transceiver or controller of the radar sensor, e.g., using antenna on packaging (AOP) or antenna on chip (AOC) technology. Antennas 206A, 206B, 208A, 208B may be omnidirectional or directional in different implementations. In some implementations, the same antennas may be used for both transmit and receive; however, in the illustrated implementations, separate antennas are used to handle the transmission and reception of radar signals. Therefore, a reference to an antenna as being a transmit antenna or a receive antenna herein does not necessarily require that the antenna be used exclusively for that purpose.

Antennas 206A, 206B, 208A, 208B in the illustrated implementations are desirably physical arranged and electronically controlled to implement a MIMO virtual antenna array (VAA), i.e., an array of virtual array elements that individually represent unique transmit/receive antenna pairs. FIG. 3, for example, illustrates an example virtual antenna array 220 formed from a set of three physical transmit antennas 222 (Tx1, Tx2, Tx3, each of which corresponding, for example, to a transmit antenna 206A, 206B in FIG. 2) and four physical receive antennas 224 (Rx1, Rx2, Rx3, Rx4, each of which corresponding, for example, to a receive antenna 208A, 208B in FIG. 2), which together form a virtual antenna array having a 3×4 or 12 element array of virtual array elements 226, thereby increasing the effective number of antennas and improving cross-range resolution. It will be appreciated that different numbers or arrangements of physical transmit and receive antennas may be used to form different sizes and arrangements of virtual antenna arrays, so the invention is not limited to the specific array illustrated in FIG. 3.

Increasing the numbers of physical transmit antennas and physical receive antennas for a virtual antenna array, and thus the number of virtual array elements in the virtual antenna array, may generally be used to increase angular resolution, detection range or signal to noise ratio. In one example implementation, an individual transceiver chip having three transmit antennas and four receive antennas may be used to form a virtual antenna array having twelve virtual array elements, which may, in some instances, be used to form a one dimensional array of <5 cm length (e.g., emphasizing azimuth resolution) or in other instances form a two dimensional of at most about 1 cm×1 cm (e.g., providing coarse resolution in both azimuth and elevation). If four of such transceiver chips are used in the same virtual antenna array, however, a total of 12 transmit antennas and 16 receive antennas may be used to generate 192 virtual array elements. Such element counts may be used for example, to generate two dimensional array layouts over about a 10 cm×10 cm area, and allowing for an angular resolution of a few degrees in both azimuth and elevation.

Now turning to FIGS. 4 and 5, these figures respectively illustrate example transmit and receive channels or paths for individual transmit and receive antennas 206A, 206B, 208A, 208B in transceiver 202A (it being understood that similar components may be used for other transceivers such as transceiver 202B). Each transmit and receive channel or path utilizes millimeter wave frequency modulated continuous wave (FMCW) radar signals in this implementation, and while radar sensor 200 utilizes multiple such channels or path in a MIMO arrangement, it will be appreciated that the principles of the invention may also be utilized in non-MIMO FMCW radar sensors as well, such that an FMCW radar sensor in some implementations may include as few as one transmit or receive channel or path.

In the transmit channel of transceiver 202A as illustrated in FIG. 4, a local oscillator (LO) 230 generates an FMCW radio frequency (RF) signal, e.g., in the range of 76 GHz to 81 GHz. The FMCW RF signal is amplified by an amplifier 232 to drive a transmit antenna 206A. The frequency of LO 230 is determined by a modulator block 234, which is capable of frequency modulating LO 230 to effectively generate pulsed signals or sweep signals referred to as chirps, e.g., using sawtooth or another form of frequency modulation. Control over modulator block 234 may be provided by a controller 236, which in some instances may be controller 204, while in other instances may be other control logic, e.g., as may be integrated into transceiver 202A. Controller 236 may be used to control various parameters of the chirps, e.g., start frequency, phase, repetition interval, slope, duration, chirp rate, etc., as well as to trigger the initiation of a chirp.

In the receive channel of transceiver 202A as illustrated in FIG. 5, a received RF signal from an antenna 208A is amplified by an amplifier 238 and then mixed with the LO 230 signal by a mixer 240 to generate a mixed signal. The mixed signal is filtered by a filter 242 and digitized by an analog to digital converter (ADC) 244 to generate a stream of digital signals. For example, the digital signals can be data samples, which in the illustrated implementation may be considered to be digital values output by ADC 244, and which may in some implementations include other identifying data such as the channel, transmit antenna, receive antenna, chirp number, timestamp, etc. associated with the digital value. The digital signals are provided to controller 236.

It will be appreciated that in different implementations, various components among components 230-244 of FIGS. 4 and 5 may be shared by multiple transmit channels or multiple receive channels and that multiple instances of some components may be dedicated to different channels. Further, other architectures may be used to implement transmit channels or receive channels in other implementations, so the invention is not limited to the specific architecture illustrated in FIGS. 4-5. In addition, in some implementations, controller 236 may be replaced by controller 204 of radar sensor 200. In these implementations, controller 204 of radar sensor 200 may control one or more components of components 230-244 described with reference to FIGS. 4 and 5.

Figure 6:
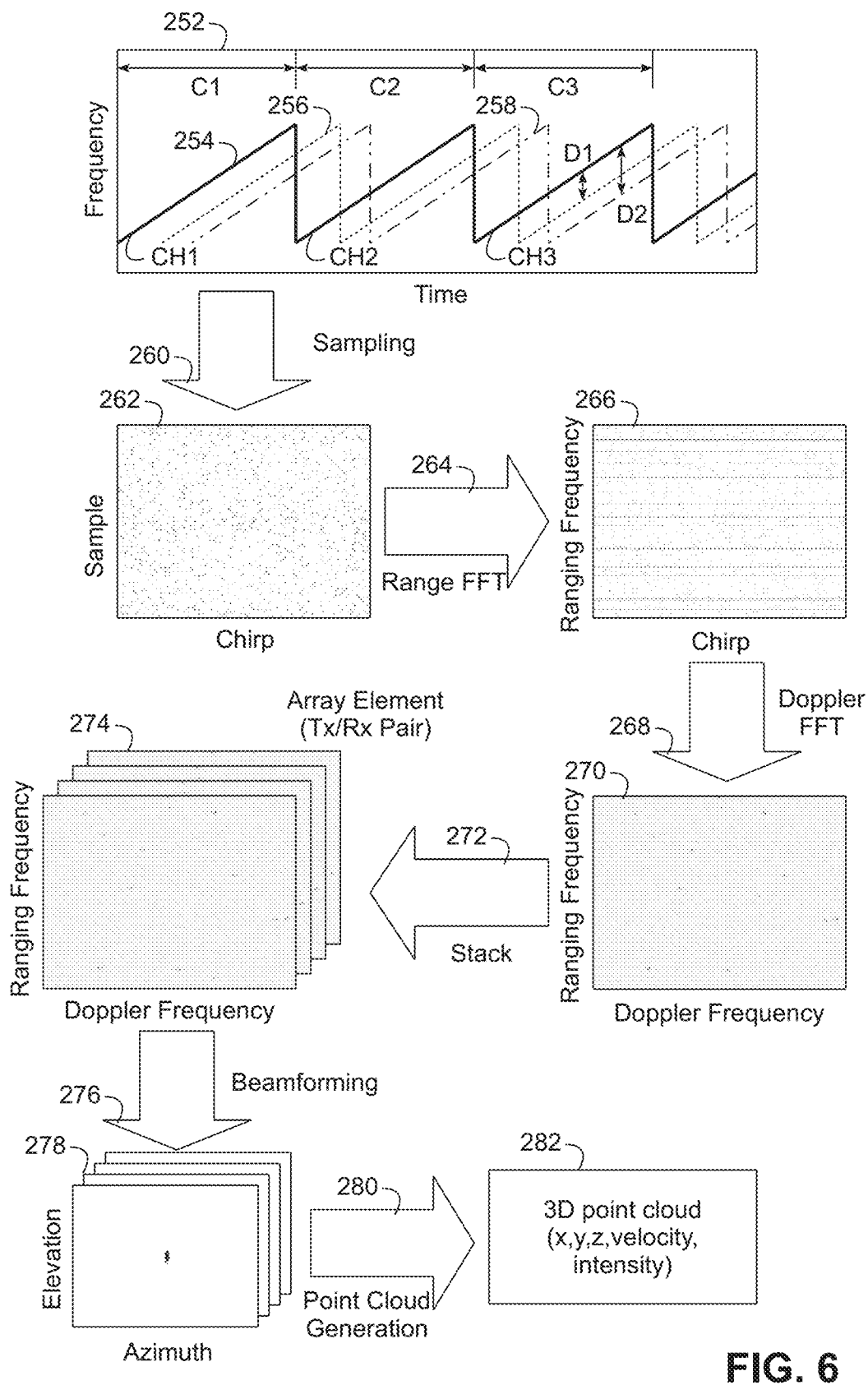
FIG. 6 illustrates an example process for sensing objects in an environment with various implementations disclosed herein.

FIG. 6 next illustrates diagrams showing general operations of a radar sensor and data generated by the radar sensor. For example, the radar sensor may be an FMCW MIMO radar sensor such as radar sensor 200 discussed above in connection with FIGS. 2-5. Graph 252, for example, illustrates a simplified time vs. frequency graph of a sequence of chirps. A chirp may represent a sweeping signal across frequency in a certain cycle. For example, a chirp CH1 is a sweeping signal during cycle C1, a chirp CH2 is a sweeping signal during cycle C2, and a chirp CH3 is a sweeping signal during cycle C3. In this example, chirps CH1-CH3 are illustrated as repetitions of sweeping signals having the same shape. However, in some implementations, chirps may dwindle over time. In addition, in this example graph, chirps C1-C3 are linearly modulated to have a sawtooth shape. However, in some implementations, the chirps may be modulated non-linearly or may be modulated to have any shape. Graph 252 shows both a transmitted signal 254 (which matches the frequency of the local oscillator) for a transmit channel Tx and received signals 256, 258 for two objects located at different ranges and received by a receive channel Rx. In this example, the transmitted signal 254 represents a sequence of chirps. As shown in this graph, the time delay from transmission of the transmit signal to being received for the two objects causes a difference in frequency, e.g., illustrated by D1 for a first object and D2 for a second object.

In some implementations, data samples collected by radar sensor 200 may be processed to generate radar data associated with certain features. For example, the radar data may be represented as data cubes associated with certain features. The features may be represented as dimensions of the data cubes where the features include, but are not limited to, fast time (the number of samples in one chirp), slow time (the number of chirps in one set of chirps, also referred to as a frame), and the number of receive channels. Where a local oscillator is operated at about 77 GHz, a controller (e.g., controller 204 in FIG. 2 or controller 236 in FIGS. 4 and 5) may process received data samples such that each frame may include 128-512 chirps and 512-1024 samples per chirp. In this example, a frame firing duration (also referred to as a coherent processing interval (CPI) may be about 5-15 ms/frame, a sample rate may be about 20 million samples/second, and a chirp duration may be about 25-100 microseconds per chirp. In some implementations, receive channels (e.g., about 4-16 Rx channels) may be processed in parallel. Although specific numbers are provided in this paragraph, they are provided as examples and any suitable numbers can be used to implement radar sensors.

Radar data (e.g., data cubes) may be processed to determine, for one or more objects (also sometimes referred to as targets) in the field of view of a radar sensor, (i) range from the radar sensor to a respective object, (ii) Doppler velocity (i.e., radial velocity of the respective object relative to the radar sensor), or (iii) angle of arrival, in terms of one or both of azimuth and elevation. First, as illustrated at 260, sampling may be performed on each receive channel over multiple chirps in a frame or CPI. The samples for all of the chirps in the frame for a particular Tx/Rx pair may be incorporated into a two dimensional array 262 where the samples are arranged in one dimension by sample number (vertical axis of FIG. 6, from first sample to last sample collected for each chirp) and in another dimension by chirp number (horizontal axis of FIG. 6, from first chirp to last chirp in a frame). In one example implementation, for example, where a frame includes 128 chirps with 1024 samples in each chirp, the array may have dimensions of 128 (horizontal)×1024 (vertical).

Next, range measurements are determined for the samples in each channel, generally by performing a Fast Fourier Transform (FFT) operation 264 (referred to herein as a range FFT), or other frequency transformation, which recovers the frequency spectrum from the digital samples in each channel to generate a range profile (power vs. range) in the frequency domain for each chirp for a particular Tx/Rx pair. It will be appreciated, in particular, that an object at a given range from a radar sensor will delay the transmitted signal 254 by a delay that is proportional to its range, and that this delay remains substantially constant over a chirp. Given that the mixed signal output by mixer 240 of FIG. 5 is effectively the difference in the instantaneous frequencies of the transmitted and received signals within a given channel, and that this difference is substantially constant over a chirp, the reflection corresponding to the object effectively generates a constant frequency "tone" in the mixed signal that resolves to a peak in the frequency domain at that frequency. Multiple objects therefore resolve to a range profile having different peaks in the frequency domain corresponding to the ranges of those objects, and may be grouped in some implementations into frequency bins corresponding to different ranges in the field of view of the radar sensor.

Each range profile for a particular chirp may be considered to be a one dimensional array representing power over a range of frequencies for that chirp. The range profiles for the chirps in the frame may therefore also be stacked into an array 266 having one dimension representing ranging frequency or frequency bin (vertical axis in FIG. 6) and one dimension representing chirp number (horizontal axis in FIG. 6), and it may be seen by the representation of array 266 that horizontal lines generally represent frequency bins where potential objects at various ranges corresponding to those frequency bins have been detected over the course of multiple chirps in a frame.

Next, velocity measurements (e.g., Doppler measurements) are determined for the samples in each channel, generally by performing a second FFT operation 268 (referred to herein as a Doppler FFT) to recover phase information corresponding to Doppler shifts. Transforming across the set of chirps results in a data set that may be represented by an array 270 arranged by ranging frequency or frequency bin (vertical axis) and Doppler frequency or frequency bin (horizontal axis), where each Doppler frequency bin generally corresponds to a particular velocity for a potential object disposed within a particular range frequency bin.

Next, beamforming is performed to determine angle of arrival information. It should be noted that arrays 262, 266 and 270 are each based on the samples for a single transmit channel/receive channel (Tx/Rx) pair. Thus, a stacking operation 272 may be performed to stack the arrays 270 generated by the Doppler FFT operation for different Tx/Rx pairs (also referred to as array elements) into a data stack 274.

It will be appreciated that each different Tx/Rx pair may have a different spatial relationship between the respective physical transmit and receive antennas for the pair, which can lead to slightly different phases reported for the same object for different Tx/Rx pairs. In the case of a uniform linear array, a third FFT operation 276 (referred to herein as a beamforming FFT) may therefore use the set of values across the different array elements in stack 274 (also referred as a beamvector) to estimate an angle of arrival at each range-Doppler location (i.e., each combination of range frequency bin and Doppler frequency bin). More generally, a set of complex responses expected for some set of azimuth and elevation angles of arrival, also known as steering vectors, may be multiplied onto the beamvectors to generate azimuth and elevation angles for each object (represented by graphs 278).

Then, the aforementioned range, Doppler and angle of arrival information may be combined in some implementations by a point cloud generation operation 280 into a three dimensional point cloud 282 including estimated position (e.g., using cartesian or polar coordinates), velocity, and signal intensity (or confidence) for a plurality of objects in the field of view of the radar sensor.

It will be appreciated that a wide variety of modifications and enhancements may be made to the aforementioned operations of FIG. 6, so the invention is not limited to this specific sequence of operations.

Those skilled in the art, having the benefit of the present disclosure, will recognize that the exemplary environment illustrated in FIGS. 1-6 is not intended to limit implementations disclosed herein. Indeed, those skilled in the art will recognize that other alternative hardware or software environments may be used without departing from the scope of implementations disclosed herein. It will also be appreciated that the various FMCW radar techniques described herein may be utilized in connection with other applications, so the invention is not limited to FMCW radars or radar sensing systems used solely in connection with the control of an autonomous vehicle.

Subsampling with Non-Uniform FMCW Chirps for Enhanced Range/Doppler/Angle Performance The ADC sampling rate on FMCW radar chipsets generally imposes a strict tradeoff between range and Doppler performance. For a desired operational range, this limit forces a tradeoff between range resolution and Doppler ambiguity as mediated by the required duration of a chirp. Range resolution, for example is generally related to bandwidth as c/(2*bandwidth) (where c is the speed of light), while maximum ambiguous velocity is generally calculated as wavelength/(4*chirp_period). Often, this tradeoff leads to a maximum Doppler that is less than the maximum expected value in real-world scenarios. One solution to this problem is to modulate the maximum unambiguous Doppler frame-to-frame so that ambiguities may be resolved; however, the range resolution at this set-point is also generally less than desired. Some conventional FMCW radar designs, for example, include a 350 m range mode, with a 70 cm range resolution and about a +/−20 m/s (about +/−45 MPH) Doppler ambiguity. An "ideal" radar, however, would maintain this maximum range while reducing both the range bin size and extending the maximum Doppler to better account for real world automotive environments.

The implementations discussed herein, on the other hand, may utilize the concept of non-uniform FMCW chirps within a frame of an FMCW radar signal, coupled with appropriate processing thereof of a received radar signal, to better address these tradeoffs and thereby enhance radar performance with respect to parameters such as range, Doppler or angle of various objects in the field of view of a radar signal. Specifically, a vehicle radar sensor in some implementations may include a radar transmitter configured to transmit a first radar signal that includes a frame associated with a plurality of FMCW chirps, with at least a subset of the FMCW chirps being non-uniform FMCW chirps and having chirp profiles that differ from one another. The vehicle radar sensor may also include a radar receiver configured to receive a second radar signal that is a reflected signal of the first radar signal, and control logic that is coupled to the radar receiver and configured to decode the second radar signal, and to use the non-uniform FMCW chirps in the frame to sense one or more parameters of one or more objects in a field of view of the radar transmitter.

FMCW chirps are non-uniform within the context of this disclosure based upon the FMCW chirps within the same frame having differing chirp profiles, and in some implementations, having chip profiles that differ from some default or baseline chirp profile that may be used in a frame, e.g., for uniform FMCW chirps in a frame that share the same chirp profile. A chirp profile, in this regard, refers to various transmission parameters or characteristics of a chirp, including, for example, one or more of a starting frequency, a duration, a slope, and a repetition interval. In the implementations discussed hereinafter, for example, non-uniform FMCW chirps within a frame may vary from one another in terms of one or both of starting frequency and repetition interval, while sharing the same duration and slope, and in some implementations, these non-uniform FMCW chirps may be accompanied within a frame with uniform FMCW chirps that have the same starting frequency, repetition interval, duration and slope. It will be appreciated, however, that non-uniform FMCW chirps and chirp profiles may vary from one another based upon other transmission parameters and/or combinations of transmission parameters in other implementations, so the invention is not limited to the specific chirp profile variations discussed herein.

The manner in which the chirp profiles of non-uniform FMCW chirps may be varied in different implementations. It will be appreciated, for example, that some commercially-available FMCW radar chipsets provide an option to alter chirp profile parameters such as starting frequency and repetition interval on an individual (chirp-by-chirp) basis. Other manners of controlling the chirp profiles of FMCW chirps emitted by a radar transmitter, however, will be appreciated by those of ordinary skill in the art having the benefit of the instant disclosure.

In the herein-described implementations, non-uniform FMCW chirps are utilized to leverage faster, lower bandwidth chirps with a pattern of frequency and duration randomization across a frame of chirps. The frequency randomization may be used to extend the bandwidth covered within a frame for higher range resolution, and the frequency randomization and duration randomization may be used to substantially increase the maximum detectable velocity. It will be appreciated that such "randomization" may also include pseudorandom sequences in addition to purely random sequences, as well as predetermined sequences (e.g., based on empirical analysis) that sufficiently distribute frequency and/or duration variations within a frame over both the overall frequency bandwidth and duration of the frame.

In some aspects, the non-uniform FMCW chirps may be configured to effectively enable subsampling to be performed on one or more dimensions to enhance the resolution of parameters such as range, Doppler and/or angle. For example, subsampling on the range dimension may be enabled through carrier frequency shredding, whereby the total band is split into multiple subbands carried by different non-uniform FMCW chirps having differing starting frequencies. Likewise, subsampling on the Doppler dimension may be used to disambiguate Doppler ambiguity introduced as a result of low computational overhead Doppler transformations such as Doppler FFT operations, and subsampling on elevation and/or azimuth angles may be used to disambiguate angle or aperture ambiguity introduced as a result of low computational overhead beamforming transformations such as beamforming FFT operations.

Figure 7:
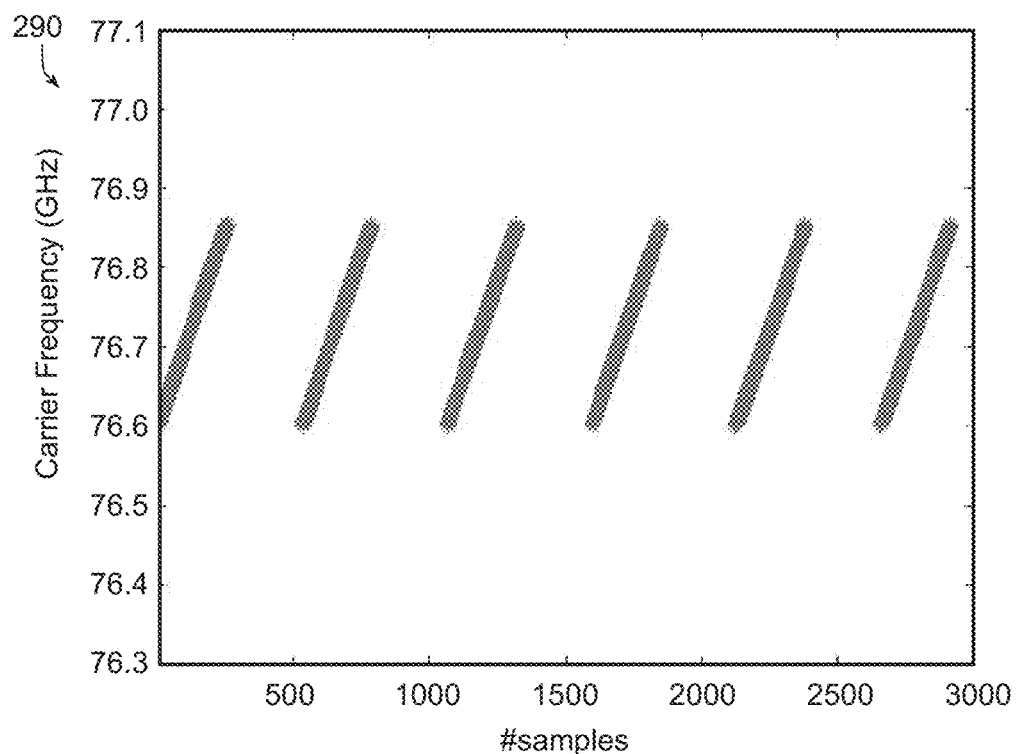
FIG. 7 illustrates a sequence of uniform FMCW chirps.
Figure 8:
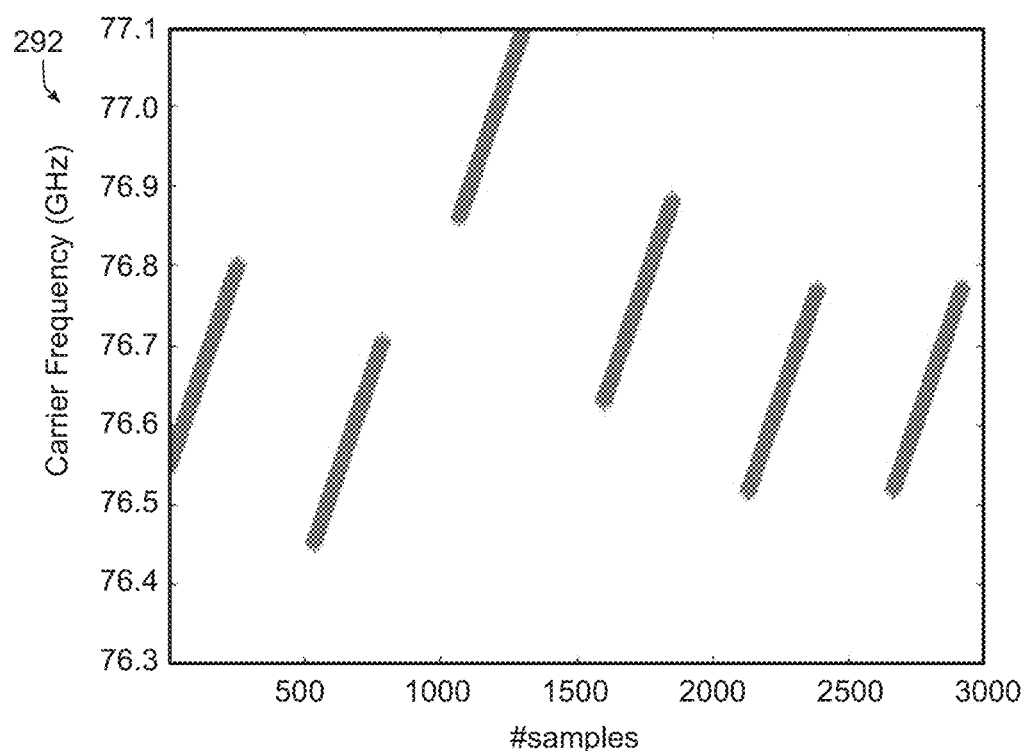
FIG. 8 illustrates a sequence of non-uniform FMCW chirps with chirp profiles having differing starting frequencies.
Figure 9:
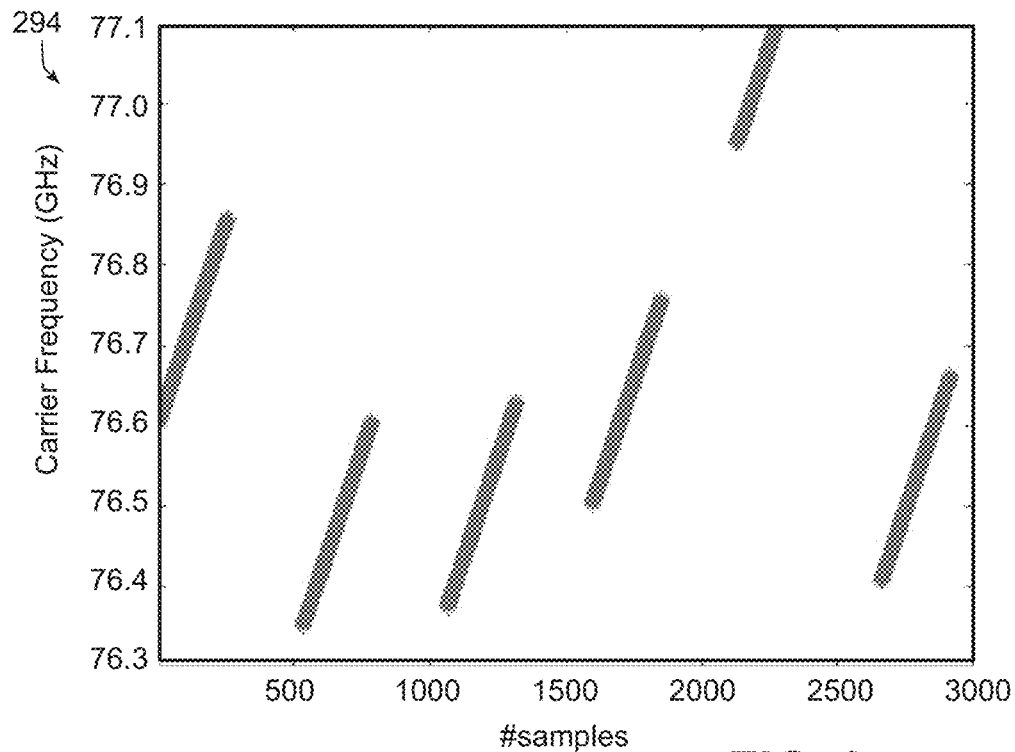
FIG. 9 illustrates a sequence of non-uniform FMCW chirps with chirp profiles having differing starting frequencies and repetition intervals.

FIGS. 7-9 illustrate example uniform (FIG. 7) and non-uniform (FIGS. 8 and 9) FMCW chirps that may be used in some implementations. FIG. 7, in particular, illustrates at 290 a sequence of uniform FMCW chirps having substantially the same starting frequency, duration, slope and repetition interval, and it will be appreciated that with such uniform FMCW chirps, range resolution is determined by chirp bandwidth (here about 250 MHz) and ghost velocities will be introduced, resulting in Doppler ambiguity. FIG. 8 illustrates at 292 a sequence of non-uniform FMCW chirps that vary from one another based on starting frequency, with the other aspects of the chirp profile, duration, slope and repetition interval, substantially the same among all of the chirps. It will be appreciated that a larger total bandwidth is occupied by all the chirps compared to FIG. 7 (about 700 MHz illustrated, vs. about 250 MHz for each chirp), leading to enhanced range resolution. Further, greater rejection of ghost velocities occurs compared to true object velocity. FIG. 9 illustrates at 294 a sequence of non-uniform FMCW chirps that vary from one another based on both starting frequency and repetition interval, with the other aspects of the chirp profile, duration and slope, substantially the same among all of the chirps. Enhanced Doppler sidelobe rejection occurs compared to FIG. 8 due to greater randomization from repetition interval variations.

Resolving range and Doppler from non-uniform FMCW chirps may occur as described below. Assume, for example, a transmitted (Tx) FMCW radar signal such as:

$$x_{tx}(t) = A^* \exp(j^* 2\pi (f_{c,n} t_s + 0.5^* \alpha t_s^2) + \varphi_0) \quad (1)$$

Also assume a single object in the scene for explanation, and that the object is assumed to be located at distance of R and moving at a relative speed of V. $\varphi_0$ is the initial phase of each chirp, the repetition interval of chirp n is $T_n$, the sampling interval in one chirp is $t_s$, the center carrier frequency of chirp n is $f_{c,n}$ and the chirp slope is $\alpha$. The transmission delay at chirp n is:

$$\tau_n = 2(R_n + Vt_s)/c = 2(R + V^*(\Sigma T_n) + Vt_s))/c \quad (2)$$

The received (Rx) FMCW radar signal will be:

$$x_{rx}(t) = B^* \exp(j^*2\pi(f_{c,n}(t_s-\tau) + 0.5^*\alpha(t_s-\tau)^2 + \varphi_0) \quad (3)$$

The beat signal after mixing $x_{tx}(t)$ and $x_{rx}(t)$, $x_m(t)$, will then be:

$$x_m(t) = x_{tx}(t)^* x_{rx}(t) \quad (4)$$

$$= AB/2^* \exp(j^*2\pi(f_{c,n}t_s + 0.5^*\alpha t_s^2 - f_{c,n}(t_s-\tau) - 0.5^*\alpha(t_s-\tau)^2)) \quad (5)$$

$$= AB/2^* \exp(j^*2\pi(f_{c,n}\tau + \alpha\tau t_s - 0.5^*\alpha^*\tau^2)) \quad (6)$$

$$= AB/2^* \exp(j^*2\pi((2\alpha R/c + 2f_{c,n}v/c + 2\alpha V(\tau T_n)/c)t_s + 2f_{c,n}V^*(\tau T_n)/c + 2f_{c,n}R/c + 2\alpha Vt_s^2/c)) \quad (7)$$

By ignoring unnecessary/negligible terms in Eq. (7), $x_m(t)$ may be rewritten as:

$$x_m(t) = AB/2^* \exp(j^*2\pi((2\alpha R/c)t_s + 2f_{c,n}V^*(\Sigma T_n)/c + 2f_{c,n}R/c)) \quad (8)$$

Three factors may be derived from Eq. (8). The first, $(2\alpha R/c)t_s$, represents a coarse estimation of the object range provided by sub-band bandwidth. The second, $2f_{c,n}R/c$, represents phase variation along the slow time due to carrier frequency variation, which provides a finer range resolution observation proportional to the total band frequency bandwidth coverage. The third, $2f_{c,n}V^*(\Sigma T_n)/c$, represents the phase variation along the slow time due to both the carrier frequency and pulse duration variation, which provides an unlimited maximum velocity detection.

Figure 10:
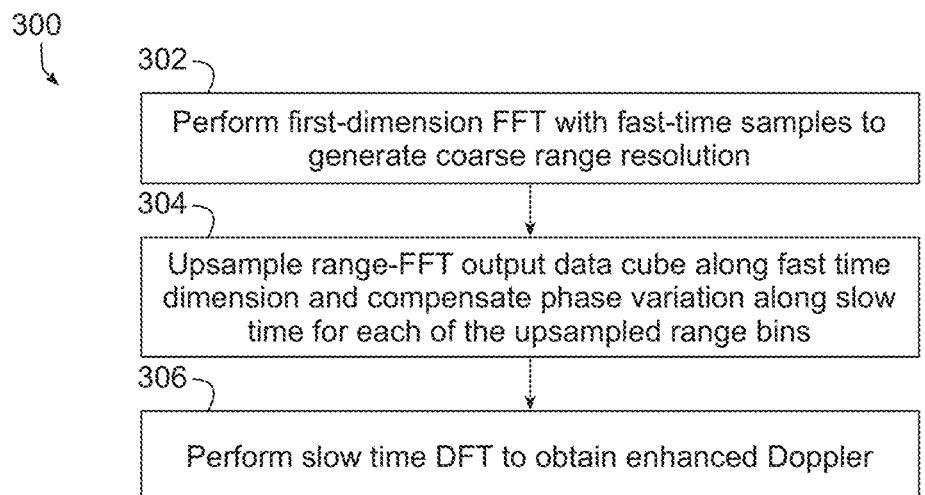
FIG. 10 illustrates an example process for sensing objects in an environment using non-uniform FMCW chirps with various implementations disclosed herein.

To resolve the range and doppler from a received radar signal in some implementations may be performed in a manner illustrated by sequence of operations 300 of FIG. 10. First, in block 302 a first dimension or range transformation, such as a Fast Fourier Transform (FFT) operation, may be conducted with fast time samples to generate a coarse range resolution data cube including coarse resolution range parameters for a plurality of objects in the field of view of the radar sensor that are based in part on the sub-band bandwidth covered by each chirp, and that are arranged into range bins in a fast time dimension.

Next, in block 304 the range-FFT output data cube may be upsampled along the fast time dimension and phase variation according to the second factor ($2f_{c,n}R/c$ from Eq. (8)) along the slow time dimension may be compensated for each of the upsampled range bins to enhance range resolution in the upsampled data cube. Then, in block 306 a slow time Doppler transformation, such as a Discrete Fourier Transform (DFT) operation, may be performed according to the third factor ($2f_{c,n}V^*(\Sigma T_n)/c$ from Es. (8)) to obtain enhanced Doppler parameters for the plurality of objects.

Figure 11:
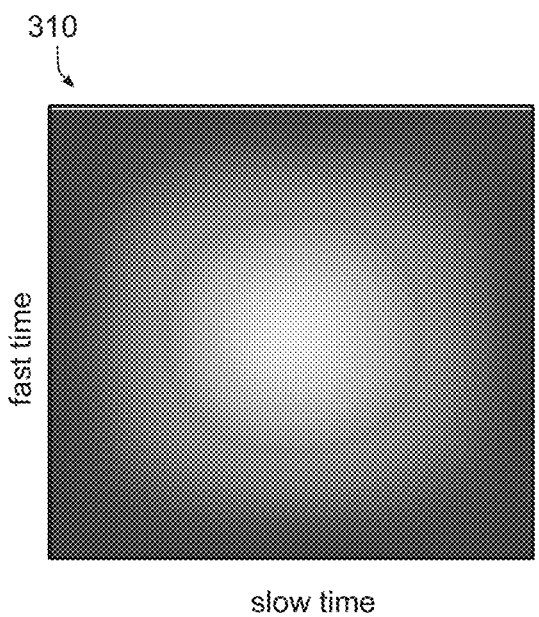
FIG. 11 illustrates an example fast time/slow time space for an idealized time domain.
Figure 12:
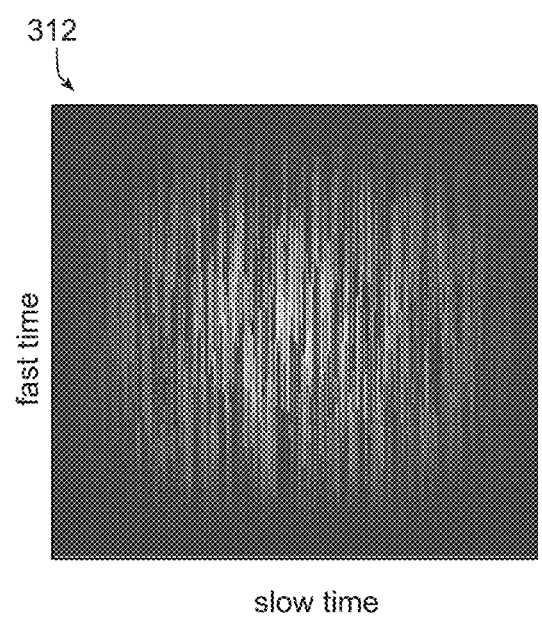
FIG. 12 illustrates an example fast time/slow time space for a sparsified version of the idealized time domain of FIG. 11 based upon sub-band sampling in accordance with various implementations disclosed herein.

As an alternative to a post ranging FFT phase correction, one can recognize the equivalency of the correction to a shift of the time domain data within a broader fast time sample space, allowing for an alternative processing approach. This interpretation also offers insights into the basis for the performance improvement. FIGS. 11 and 12, for example, respectively depict a fully sampled fast time/slow time space 310 (FIG. 11) and a time-domain representation 312 of a sub-band sampling method utilized in some of the illustrated implementations (FIG. 12). Here it becomes clear that the ADC limitation is translated into a bandwidth limitation (only sampling a sub-band of the full bandwidth across fast time for any given chirp) while the frequency shifting capability allows the full bandwidth to be covered. The resulting data is essentially a sparsified version of idealized time domain—one with better range bandwidth (range resolution) and faster chirps (Doppler ambiguity).

It will be appreciated therefore that when applying the herein-described techniques one may have a choice of only shredding carrier frequency while keeping repetition interval constant, which still provides enhanced range detection performance. It should be noted, however, that a constant repetition interval may lead to less-random phase variation of the aforementioned third factor and therefore may generate larger Doppler sidelobes and higher possibility of Doppler ambiguity, so additional benefits may be realized through the use of this additional chirp non-uniformity.

In addition, in order to reduce the computational load associated with performing the more computationally-expensive DFT operations in block 306 of FIG. 10, it may also be desirable in some implementations to utilize a "two-stage disambiguation" approach, described in greater detail below in connection with FIGS. 13-16, that may reduce computational load while still maintaining the aforementioned enhanced range-doppler benefits.

Figure 13:
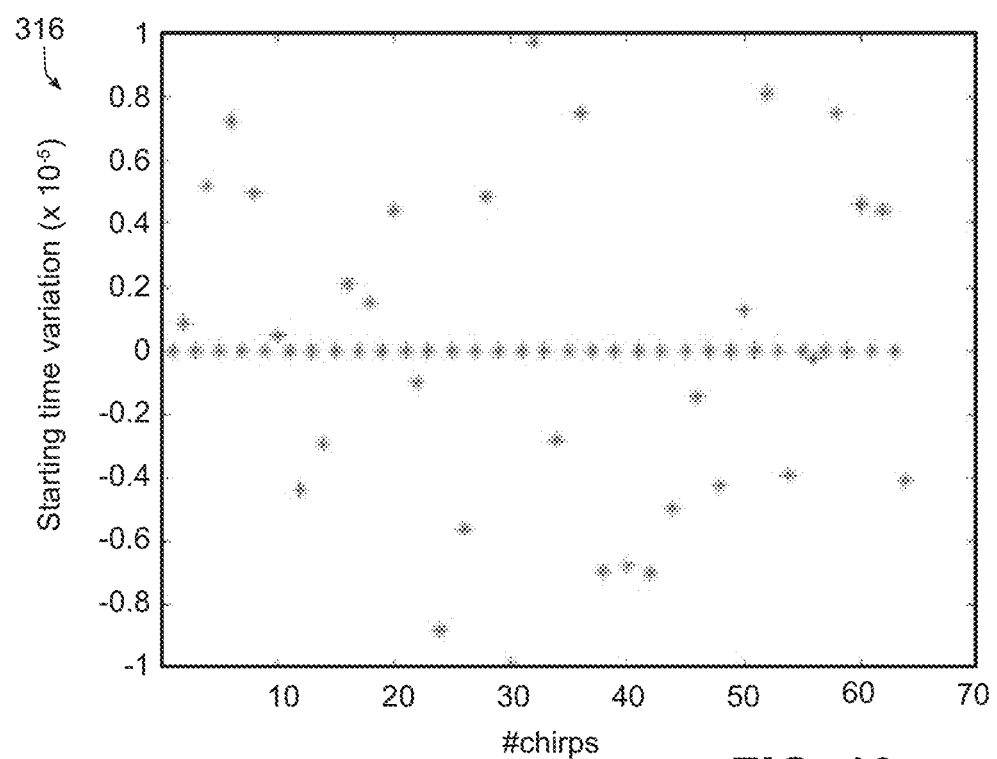
FIG. 13 illustrates repetition interval variances in a sequence of interleaved uniform and non-uniform FMCW chirps.
Figure 14:
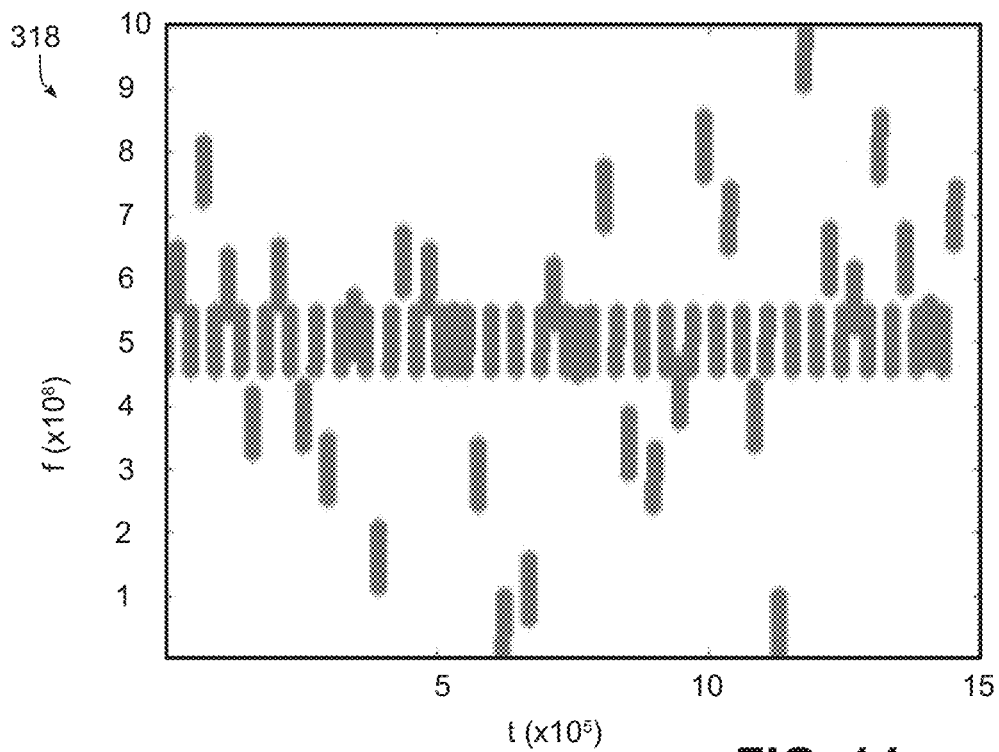
FIG. 14 illustrates starting frequency variances in a sequence of interleaved uniform and non-uniform FMCW chirps.

With such an approach uniform and non-uniform FMCW chirps may be interleaved with one another along the slow time, as illustrated in FIGS. 13 and 14. FIG. 13, in particular, illustrates at 316 a graph of starting time variations (y-axis) over a sequence of chirps (x-axis), with odd chirps using a uniform/constant repetition interval, and even chirps using variations in starting time/repetition interval of about +/−10 µs. FIG. 14 illustrates at 318 a graph of frequency variations (y-axis) over a sequence of chirps (x-axis), with odd chirps using a uniform/constant starting frequency, and even chirps using variations in starting frequency of about +/−500 MHz. This frequency variation range can be changed depending on the design specification, with a theoretical maximum range up to about +/−2 GHz. In both figures, the repetition interval and starting frequency variations may be implemented using random, pseudorandom or predetermined sequences that distribute chirps both over a larger frequency band than the original chirps and over the duration of the frame.

Figure 15:
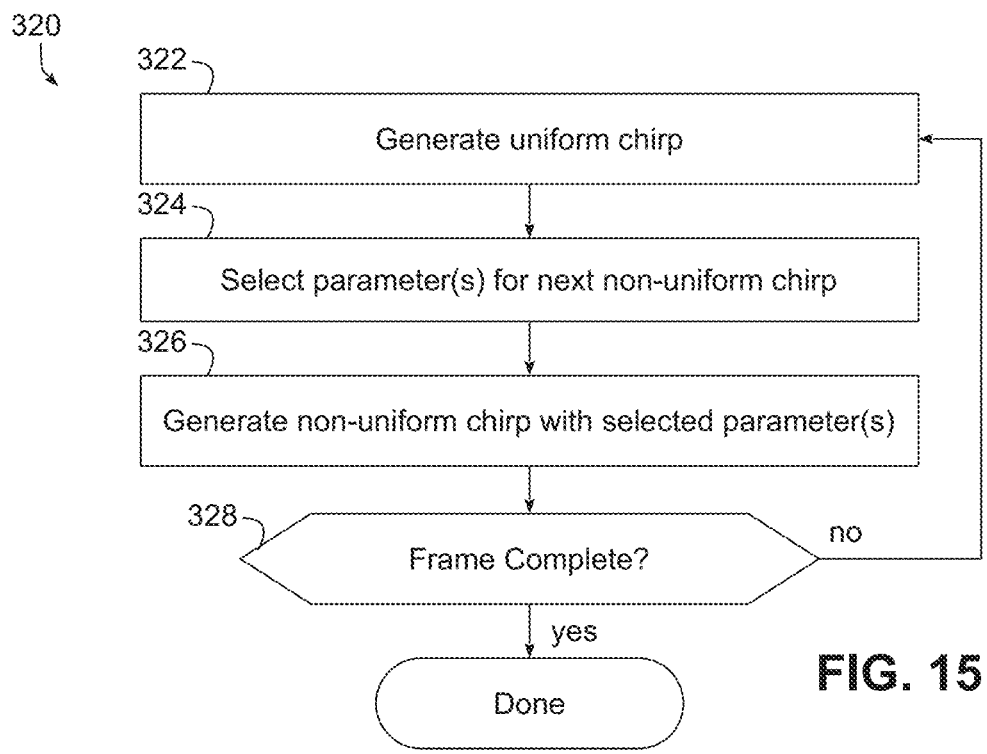
FIG. 15 illustrates an example process for generating a frame with interleaved uniform and non-uniform FMCW chirps with various implementations disclosed herein.

As illustrated in FIG. 15, an example sequence of operations for generating a frame of FMCW chirps is illustrated at 320, and may be implemented, for example, using control logic of a radar sensor to control a radar transmitter thereof. In addition, in some implementations, the radar sensor may be implemented as a MIMO radar sensor, e.g., MIMO radar sensor 200 of FIGS. 2-5, whereby sequence 320 represents operations that may be performed by controller 236 to generate a single transmit (Tx) radar signal from a transceiver 202A representing a single transmit channel, and it will be understood that other transmit channels may generate other transmit radar signals including uniform and/or non-uniform FMCW chirps.

Sequence 320 in the illustrated implementation interleaves uniform and non-uniform FMCW chirps such that a frame includes an equal number of alternating uniform and non-uniform FMCW chirps. Thus, in block 322, sequence 320 generates a uniform FMCW chirp, which modulates a local oscillator signal and thereby causes the associated radar transmitter to emit a FMCW radar signal including the uniform FMCW chirp embedded therein. Next, in block 324, one or more parameters for the next non-uniform chirp are selected in order to generate a non-uniform chirp profile for the next non-uniform chirp, e.g., by selecting one or more of a starting frequency, duration, slope or repetition interval for the non-uniform chirp according to a random, pseudorandom or predetermined sequence. Block 326 then generates the non-uniform FMCW chirp using the selected parameter(s), which modulates the local oscillator signal and thereby causes the associated radar transmitter to emit a FMCW radar signal including the non-uniform FMCW chirp embedded therein. Block 328 determines whether the frame is complete, i.e., whether the number of FMCW chirps equals the total number of FMCW chirps per frame, and if not, returns control to block 322 to generate another uniform FMCW chirp. Once all FMCW chirps have been generated for the frame, however, sequence 320 is complete. It will be appreciated that in other implementations, the number and/or order of uniform and non-uniform FMCW chirps may vary, so the invention is not limited to the 1:1 ratio of uniform and non-uniform FMCW chirps illustrated in FIG. 15.

Figure 16:
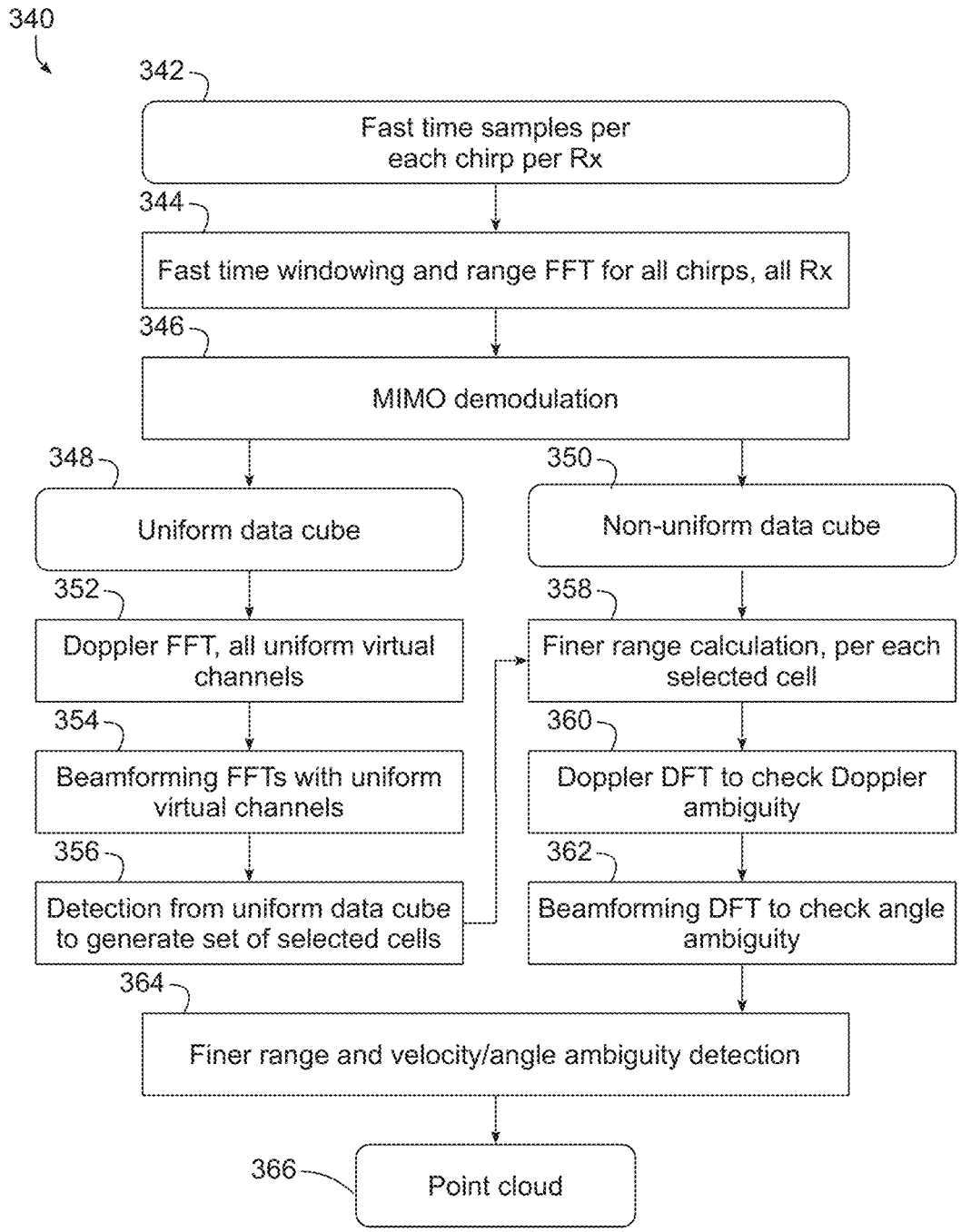
FIG. 16 illustrates an example process for processing a frame with interleaved uniform and non-uniform FMCW chirps with various implementations disclosed herein.

Now turning to FIG. 16, this figure illustrates an example sequence of operations 340 for processing a frame of FMCW chirps consistent with some implementations. Sequence 340 may be implemented, for example, using control logic of a radar sensor that processes digital data samples received from a radar receiver thereof. In addition, in some implementations, the radar sensor may be implemented as a MIMO radar sensor, e.g., MIMO radar sensor 200 of FIGS. 2-5, whereby sequence 340 represents operations that may be performed by controller 236 to process a set of receive (Rx) radar signals from a plurality of transceivers 202A representing a plurality of receive channels.

As noted above, sequence 340 employs a two-stage disambiguation approach that uses the uniform FMCW chirps in a frame to initially, and with relatively low computational overhead, identify potential or candidate objects and calculate range and/or Doppler parameters therefor, generally using light-weight FFT computations when performing the range and/or doppler transformations. In particular, a first-stage operation in some implementations may be used to calculate range parameters with relatively coarse range resolutions and Doppler parameters in the presence of Doppler ambiguities. Then a first-stage detection may be applied to select range (with coarse range resolution) and Doppler (with multiple ambiguities) candidate objects.

Thereafter, in a second stage, the non-uniform FMCW chirps may be used for more computationally-expensive operations, e.g., DFT computations, that are focused on the identified candidate objects, thereby reducing the overall computational overhead that would otherwise be required. In particular, second-stage slow time DFT operations corresponding generally to block 306 of FIG. 10 and described above may be used to check the finer range resolution and true/disambiguated Doppler based on the first-stage detected candidates.

In addition, in some MIMO-based implementations, this two-stage disambiguation approach may be further extended to one or both of azimuth and elevation angle domains. In the angle context, the antenna array may be conceptually separated into a uniform rectangular array and a sparse array. The uniform rectangular array features a uniform and large antenna gap, and may be used to initially and with relatively low computational overhead calculate azimuth and/or elevation angles with light-weight FFT operations, which provides a relatively high angle resolution but with a relatively small unambiguous field of view due to the relatively large antenna gap. Then, in a second stage, the detected azimuth and/or elevation values from the first-stage calculations may be disambiguated by the sparse antenna array with more computational-intensive DFT operations.

Sequence 340 of FIG. 16 is an example implementation of a signal processing flow to combine these aforementioned 4-dimensional object features or parameters (range, Doppler, azimuth and elevation). As represented by block 342, input to sequence 340 is a set of fast time samples for each chirp in the frame, and for each receive (Rx) channel. For the purposes of this example, it is assumed that there are 16 Rx channels, and that each frame includes 512 chirps, of which 256 are uniform FMCW chirps interleaved with 256 non-uniform FMCW chirps having chirp profiles differing by starting frequency and repetition interval. Moreover, each chirp is represented by 256 samples, so the number of fast time samples processed for each frame in this implementation would be 256×512×16=786,432.

In block 344, fast time windowing and range transformations using lower computational overhead FFT operations are performed for all chirps and all Rx channels to generate coarse resolution range parameters, and then in block 346, MIMO demodulation is performed. From this MIMO demodulation, two data cubes, a uniform data cube 348 and a non-uniform data cube 350, may be generated. While in some implementations, the non-uniform data cube could also include uniform chirps from uniform antenna arrays, in the illustrated implementation, the uniform data cube includes only uniform chirps from uniform antenna arrays and the non-uniform data cube includes only non-uniform chirps from sparse antenna arrays.

Next, in block 352, Doppler transformations using lower computational overhead FFT operations are performed on the uniform data cube, and on all uniform virtual channels, and in block 354, beamforming transformations using lower computational overhead FFT operations are performed on the uniform data cube, and on all uniform virtual channels. It will be appreciated that both of these blocks will generally maintain desired Doppler/angle resolution, but will also introduce Doppler/angle ambiguities.

Next, in block 356, potential or candidate objects are detected from the uniform data cube, e.g., by thresholding each cell, and the potential objects may include cells meeting the threshold, and in some instances, one or more neighboring cells to each detected cell, resulting in a set of selected cells from the uniform data cube representing the potential objects. Control then passes to block 358 to perform a finer range calculation on these selected cells, e.g., compensating phase variation along the slow time due to carrier frequency variation.

Then, in block 360, Doppler disambiguation is performed using higher computation overhead Doppler transformations such as Doppler DFT operations and thereby resolve the Doppler ambiguities introduced in the uniform data cube. Likewise, in block 362, beamforming disambiguation is performed using higher computation overhead beamforming transformations such as beamforming DFT operations and thereby resolve the angle ambiguities introduced in the uniform data cube.

Then, in block 364, finer range and Doppler/angle ambiguity detection is performed based upon the calculations performed in blocks 358-362, resulting in the output of a set of objects, along with range, Doppler, elevation angle and azimuth angle parameters, which in some implementations, may be formatted into a point cloud 366.

It will therefore be appreciated that enhanced radar performance may be obtained through the use of non-uniform FMCW chirps, and with a substantial reduction in computational overhead in some implementations. As an example, consider a 4D imaging radar sensor for use in an automotive application, where it is desirable to support a range of 300 m with 0.15 m resolution, a velocity of +/−76.8 m/s with an 0.1 m/s resolution, an azimuth angle of +/−50 degrees with a 1 degree resolution and an elevation angle of +/−15 degrees with a 1 degree resolution. Such a range may be met using a 1 GHz bandwidth and 256×8 samples per chirp, and such a velocity may be met using 512×3 chirps and a 19.5 ms frame duration. The azimuth angle may be met by a 20 cm virtual aperture with 100 horizontal channels while the elevation angle may be met by a 20 cm virtual aperture with 30 vertical channels.

Using a conventional approach, the total number of 4D cells that would need to be calculated in order to meet these requirements would be (256×8)×(512×3)×100×30=9.4e9 cells per frame. In contrast, using the two stage disambiguation approach discussed above, the same requirements may be met with substantially reduced processing overhead. Assuming 96 virtual channels for each data cube, the number of 4D cells that would need to be calculated using the above sequence of operations would be (256×256×16×16)+((8×3×7×3)×#selected_cells)), assuming that the range upsampling factor for finer range bin calculation is 8, 3 ambiguous candidates per detected doppler, 7 ambiguous candidates per detected azimuth angle, and 3 ambiguous candidates per detected elevation angle. Assuming that the first stage results in a reasonable number of selected cells such as 5000, the total number of 4D cells that would need to be calculated would be 1.9e7 cells per frame, which is roughly 0.2% of the number required from a conventional approach, while still maintaining comparable parameter resolutions for the identified objects.

Other variations will be apparent to those of ordinary skill. Therefore, the invention lies in the claims hereinafter appended.

What is claimed is:

1. A radar sensor for a vehicle, comprising: a radar transmitter configured to transmit a first radar signal, the first radar signal including a frame associated with a plurality of frequency modulated continuous wave (FMCW) chirps, wherein the frame is a coherent processing interval, wherein the plurality of FMWC FMCW chirps includes a plurality of uniform FMCW chirps having a same default chirp profile and a plurality of non-uniform FMCW chirps having chirp profiles that differ from one another and from the default chirp profile based at least upon differing starting frequency and repetition interval;
 a radar receiver configured to receive a second radar signal that is a reflected signal of the first radar signal; and
 control logic coupled to the radar receiver and configured to process the second radar signal, based on the uniform and non-uniform FMCW chirps in the frame, to sense one or more parameters of an object in a field of view of the radar transmitter.

2. The radar sensor of claim 1, wherein the uniform FMCW chirps and the non-uniform FMCW chirps are interleaved with one another such that the frame includes alternating uniform and non-uniform FMCW chirps.

3. The radar sensor of claim 1, wherein the control logic is configured to process the second radar signal to sense one or more parameters of a plurality of objects in a field of view of the radar transmitter, and wherein the control logic uses the uniform and non-uniform FMCW chirps in the frame to sense the one or more parameters of the plurality of objects by:
 performing a range transformation with fast-time samples of the second radar signal to generate a coarse resolution data cube including coarse resolution range parameters for the plurality of objects and arranged in a plurality of range bins in a fast-time dimension, wherein the range transformation comprises a Fast Fourier Transform (FFT) transformation;
 upsampling the generated coarse resolution data cube along the fast-time dimension to generate an upsampled data cube;
 compensating for phase variations due to starting frequency variations in the non-uniform FMCW chirps along a slow-time dimension of the upsampled data cube for each of the plurality of range bins to enhance range resolution in the upsampled data cube; and
 performing a Doppler transformation on the upsampled data cube based upon starting frequency and repetition interval variations in the non-uniform FMCW chirps to generate Doppler parameters for the plurality of objects, wherein the Doppler transformation comprises a Discrete Fourier Transform (DFT) transformation.

4. The radar sensor of claim 1, wherein the control logic uses the uniform and non-uniform FMCW chirps in the frame to sense the one or more parameters of the object by:
 generating a uniform data cube by performing a range transformation with fast-time samples of the second radar signal and using the uniform FMCW chirps; and
 detecting a plurality of candidate objects in the uniform data cube.

5. The radar sensor of claim 1, wherein the chirp profiles of the non-uniform FMCW chirps differ based upon starting frequency such that a total frequency band of the frame is split into a plurality of sub-bands defined by the non-uniform FMCW chirps, and wherein the control logic uses the non-uniform FMCW chirps in the frame to sense the one or more parameters of the object by subsampling on range within the total frequency band of the frame.

6. The radar sensor of claim 1, wherein the control logic uses the non-uniform FMCW chirps in the frame to sense the one or more parameters of the object by subsampling on Doppler over a duration of the frame.

7. The radar sensor of claim 1, wherein the control logic uses the uniform and non-uniform FMCW chirps in the frame to sense the one or more parameters of the object by:
 generating uniform and non-uniform data cubes by performing a range transformation with fast-time samples of the second radar signal and using the uniform and non-uniform FMCW chirps;
 detecting a plurality of candidate objects in the uniform data cube, including performing a Doppler Fast Fourier Transform (FFTs) transformation; and
 performing finer range calculation on the detected plurality of candidate objects by compensating phase variation along slow time due to carrier frequency variation using the non-uniform data cube.

8. The radar sensor of claim 7, wherein the control logic further uses the uniform and non-uniform FMCW chirps in the frame to sense the one or more parameters of the object by performing Doppler disambiguation using a Discrete Fourier Transform (DFT) transformation with the non-uniform data cube to resolve one or more Doppler ambiguities introduced in the uniform data cube.

9. The radar sensor of claim 8, wherein detecting the plurality of candidate objects in the uniform data cube further includes performing a beamforming FFT transformation, and wherein the control logic further uses the uniform and non-uniform FMCW chirps in the frame to sense the one or more parameters of the object by performing beamforming disambiguation using a DFT transformation with the non-uniform data cube to resolve one or more angle ambiguities introduced in the uniform data cube.

10. The radar sensor of claim 7, wherein generating the uniform and non-uniform data cubes includes performing Multiple-Input Multiple-Output (MIMO) demodulation after performing the range transformation.

11. The radar sensor of claim 7, wherein the uniform data cube only includes uniform chirps and the non-uniform data cube only includes non-uniform chirps.

12. The radar sensor of claim 7, wherein the uniform data cube only includes uniform chirps and the non-uniform data cube only includes uniform and non-uniform chirps.

13. A method of operating a radar sensor for a vehicle, comprising: transmitting a first radar signal, the first radar signal including a frame associated with a plurality of frequency modulated continuous wave (FMCW) chirps, wherein the frame is a coherent processing interval, wherein the plurality of FMCW chirps includes a plurality of uniform FMCW chirps having a same default chirp profile and a plurality of non-uniform FMCW chirps having chirp profiles that differ from one another and from the default chirp profile based at least upon differing starting frequency and repetition interval; and
receiving a second radar signal that is a reflected signal of the first radar signal; and
processing the second radar signal, based on the uniform and non-uniform FMCW chirps in the frame, to sense one or more parameters of an object in a field of view of the radar sensor.

14. An autonomous vehicle control system, comprising: a radar transmitter configured to transmit a first radar signal, the first radar signal including a frame associated with a plurality of frequency modulated continuous wave (FMCW) chirps, wherein the frame is a coherent processing interval, wherein the plurality of FMCW chirps includes a plurality of uniform FMCW chirps having a same default chirp profile and a plurality of non-uniform FMCW chirps having chirp profiles that differ from one another and from the default chirp profile based at least upon differing starting frequency and repetition interval;
a radar receiver configured to receive a second radar signal that is a reflected signal of the first radar signal; and
control logic coupled to the radar receiver and configured to process the second radar signal, based on the uniform and non-uniform FMCW chirps in the frame, to sense one or more parameters of an object in a field of view of the radar transmitter.

15. The autonomous vehicle control system of claim 14, wherein the uniform FMCW chirps and the non-uniform FMCW chirps are interleaved with one another such that the frame includes alternating uniform and non-uniform FMCW chirps.

16. The autonomous vehicle control system of claim 14, wherein the control logic is configured to process the second radar signal to sense one or more parameters of a plurality of objects in a field of view of the radar transmitter, and wherein the control logic uses the uniform and non-uniform FMCW chirps in the frame to sense the one or more parameters of the plurality of objects by:
performing a range transformation comprising a Fast Fourier Transform (FFT) transformation with fast-time samples of the second radar signal to generate a coarse resolution data cube including coarse resolution range parameters for the plurality of objects and arranged in a plurality of range bins in a fast-time dimension;
upsampling the generated coarse resolution data cube along the fast-time dimension to generate an upsampled data cube;
compensating for phase variations due to starting frequency variations in the non-uniform FMCW chirps along a slow-time dimension of the upsampled data cube for each of the plurality of range bins to enhance range resolution in the upsampled data cube; and
performing a Doppler transformation comprising a Discrete Fourier Transform (DFT) transformation on the upsampled data cube based upon starting frequency and repetition interval variations in the non-uniform FMCW chirps to generate Doppler parameters for the plurality of objects.

17. The autonomous vehicle control system of claim 14, wherein the control logic uses the uniform and non-uniform FMCW chirps in the frame to sense the one or more parameters of the object by:
generating a uniform data cube by performing a range transformation with fast-time samples of the second radar signal and using the uniform FMCW chirps; and
detecting a plurality of candidate objects in the uniform data cube.

18. The autonomous vehicle control system of claim 14, wherein the chirp profiles of the non-uniform FMCW chirps differ based upon starting frequency such that a total frequency band of the frame is split into a plurality of subbands defined by the non-uniform FMCW chirps, and wherein the control logic uses the non-uniform FMCW chirps in the frame to sense the one or more parameters of the object by subsampling on range within the total frequency band of the frame.

19. The autonomous vehicle control system of claim 14, wherein the control logic uses the non-uniform FMCW chirps in the frame to sense the one or more parameters of the object by subsampling on Doppler over a duration of the frame.

* * * * *